Oct. 11, 1955  A. E. HOAG  2,720,233
TRANSVERSELY RECIPROCATING CUTTER TYPE SLICING MACHINE
Filed Jan. 8, 1952  2 Sheets-Sheet 1

INVENTOR
ARTHUR HOAG
BY Stanley Walder
ATTORNEY

Oct. 11, 1955  A. E. HOAG  2,720,233
TRANSVERSELY RECIPROCATING CUTTER TYPE SLICING MACHINE
Filed Jan. 8, 1952  2 Sheets-Sheet 2
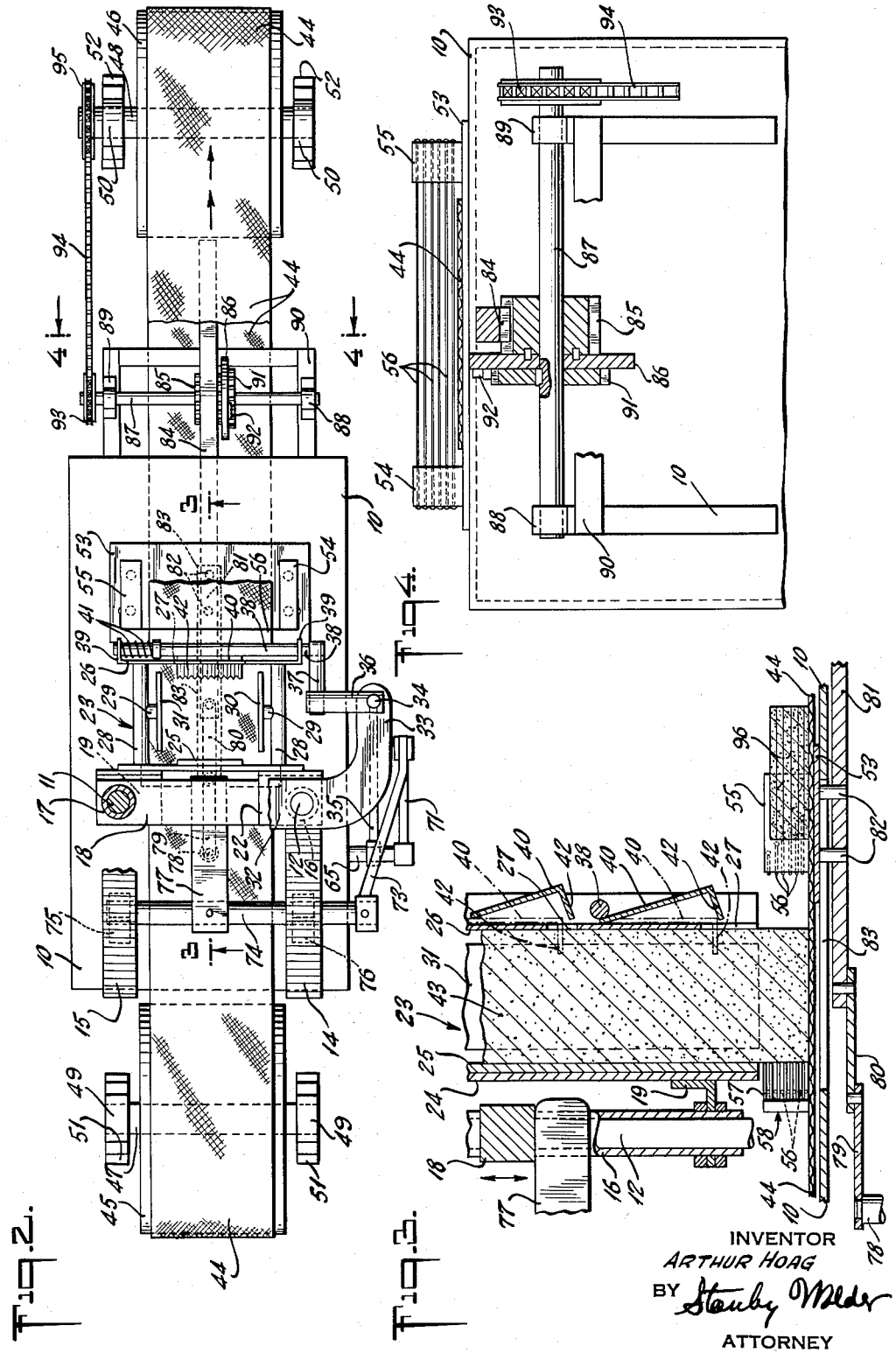

United States Patent Office 2,720,233
Patented Oct. 11, 1955

2,720,233

TRANSVERSELY RECIPROCATING CUTTER TYPE SLICING MACHINE

Arthur E. Hoag, Jersey City, N. J., assignor to June Dairy Products Co., Inc., New York County, N. Y., a corporation of Delaware Application January 8, 1952, Serial No. 265,437

12 Claims. (Cl. 146—151)

The present invention relates to improvements in slicing machines and more particularly those adapted to produce from bulk semi-soft materials such as, for example, loaf cheese, processed meats and the like, slabs or stacked slices thereof.

The trend in the marketing of semi-soft materials and particularly in the case of foods such as cheeses, processed meats and the like which are ultimately served in slices, is to package the same for sale in stacks of aligned slices. Current practice is to employ machines which produce single slices and then use hand labor to collect and stack the same. Aside from making necessary the handling of such material, such machines fail to produce slices of uniform thickness and hence necessitate the weighing of stacks of slices and the reprocessing of sizeable portions of the sliced material. In addition, such single cut slicers are not adapted for continuous feeding of bulk material but must be stopped periodically for reloading.

An object of the present invention is to provide a slicing machine particularly adapted to the production of stacks of slices of such foods as cheeses and processed meats which will produce slices of uniform thickness and be capable of continuous operation.

A further object thereof is to provide such a machine which may be either continuously or intermittently fed without interrupting the slicing operation thereof.

A still further object is the provision of such a machine to which may be fed for slicing different materials of varying dimensions.

Still another object thereof is the provision of such a machine which is so constructed as to be easily cleaned and kept sanitary.

These and other objects may be achieved by the subject invention which, in the preferred form, includes a frame upon which is mounted a source of power and which supports a preferably vertical hopper adapted to be fed from the top, a conveyor belt movable underneath said hopper, a horizontally reciprocable carriage carrying horizontally extending, vertically spaced cutting elements which are so mounted as to be alternately thrust into and withdrawn from the area between the open bottom end of said hopper and the portion of the take-away conveyor belt beneath it, there being clamping means associated with said hopper adapted to hold the material in place therein while the cut slices are removed by said conveyor. To this construction there may be added means to elevate said hopper and its contents before said slices are so removed, so as to remove the possibility of the frictional engagement of such stack of slices and the bulk material in the hopper. While the material to be sliced is gravity fed to the slicing area, power is applied to the various parts described and they are arranged so that at the beginning of a cutting stroke, e. g., as the cutting elements begin to approach the material to be sliced protruding from the bottom of the hopper and supported by the conveyor belt, said belt is motionless, the clamping means need not be engaged with the bulk material in the hopper and the hopper itself is in its lowest position, but when the said elements commence their return, the conveyor moves to withdraw the cut slices in front of said elements, the clamping means have closed upon the bulk material and the hopper rises to clear the bottom of the bulk material held therein from the top of the stacked slices.

While the device illustrated in the drawings and more fully explained below is particularly adapted to slicing loaf cheese, it should be understood that the said device is merely the preferred form and that the subject invention may be embodied in forms which will slab or slice other foods, soap and other semi-soft substances. Further, it should be understood that the foregoing statement of the object of the invention and brief summary thereof are intended to generally explain the same without limiting it in any manner.

Fig. 2 is a top plan view thereof likewise broken away.

Fig. 3 is an enlarged cross-sectional view taken along line 3—3 of Fig. 2.

Fig. 4 is an enlarged fragmentary end view taken along line 4—4 of Fig. 2.

Figure 1:
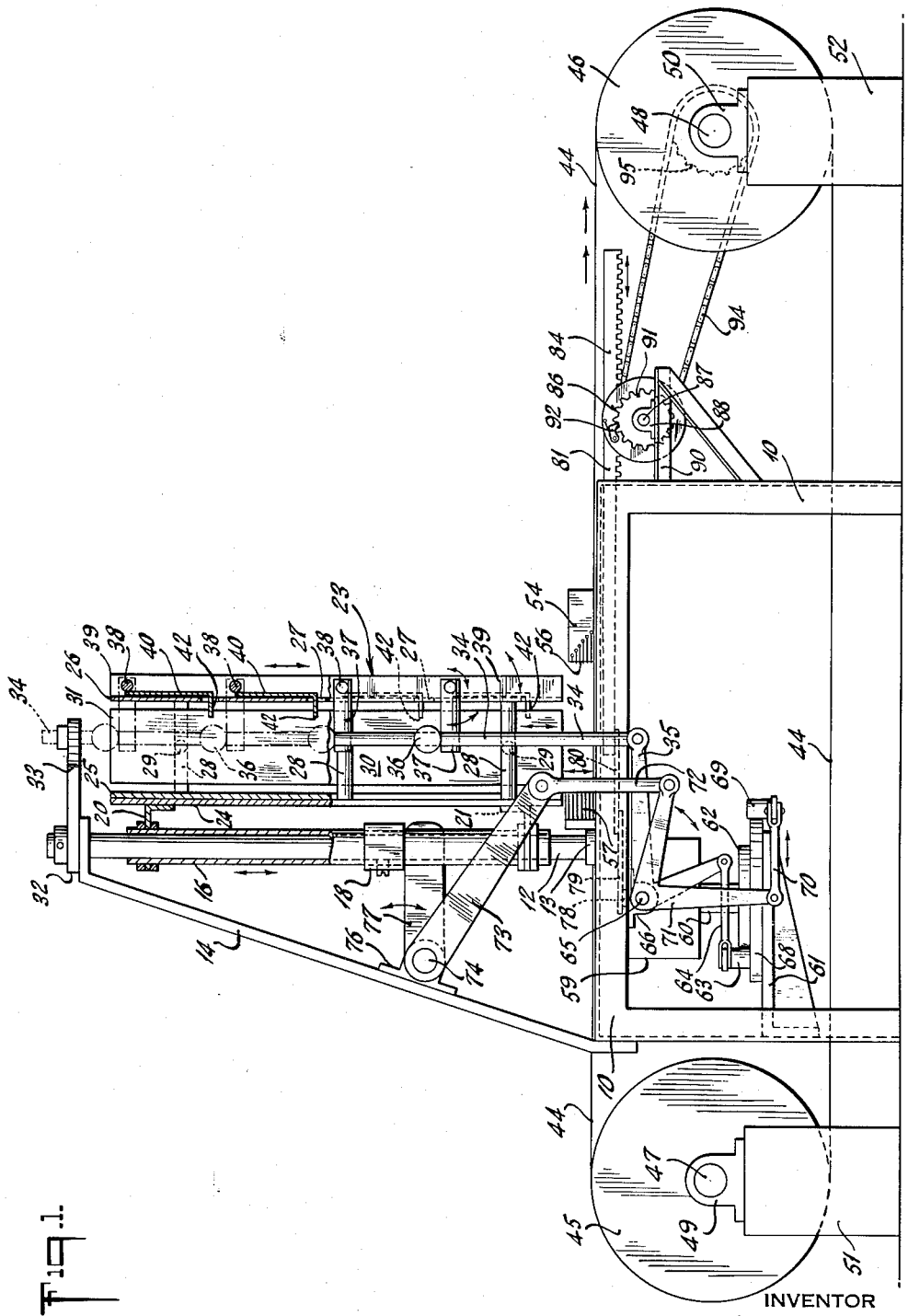
Fig. 1 is a side elevation view of a slicing machine embodying the subject invention, broken away and sectioned at various portions to more fully reveal internal construction.

Referring to the drawings, the embodiment shown includes a four-legged frame 10, atop which, toward one end, and transversely spaced are mounted two solid standards 11 and 12 supported and held at the lower end in fittings 13 and braced proximate the upper ends by mounting plates 15 and 14 respectively. Longitudinally extending sleeves 16 and 17 are slideably mounted about said standards and are fixedly interconnected by crosspiece 18. Said cross piece is linked to the source of power as more fully explained below. Each sleeve bears near its top and bottom rigidly mounted outstanding and downwardly extending angle pieces 19, 20, 21, and 22 to which is affixed hopper 23. Said hopper includes a vertically extending back plate 24, inwardly carrying a paralleled, but narrower, friction plate 25 having a waffled design on its exposed face, a spaced parallel front plate 26 having horizontal slots 27 therethrough connected to back plate 24 by means of stud shafts 28 from which inwardly extend studs 29 carrying the side walls of hopper 23 in the form of side plates 30 and 31.

A cross plate 32, fastened so as to extend horizontally across standards 11 and 12 proximate the top of said standards, has a frontwardly curved extension 33, the forward portion of which is apertured so as to provide a guide for a clamp shaft 34 which extends therethrough, the bottom portion of said shaft being pivotally linked to the upper arm of a bell crank 35 which links the shaft to the power source, as will be more fully explained below.

At vertical intervals along said shaft are inwardly projecting stud shafts 36 to which are pivotally affixed forwardly extending extension bars 37 which in turn are keyed to rocker shafts 38 which in turn are horizontally supported in front of front plate 26 of hopper 23 by means of apertured ears 39. Each of said rocker shafts 38 bear rigidly dependent therefrom L-shaped clamp members 40. Rocker shaft 38, and consequently clamp members 40, are biased by spring 41 so that the short arm 42 normally extends through slots 27 in front plate 26 except in the case of the lowest clamp member, the short arm of which extends beneath front plate 26 into hopper 23. The inner edges of short arm 42 of said clamp members may be serrated to afford efficient gripping means for seizing the material to be sliced such as a loaf of cheese 43.

An endless take-away conveyor belt 44 runs across the top of frame 10 and between the legs thereof, being supported at one end by an idler roller 45 and at the other by a driven roller 46, said rollers being respectively rotatably mounted by means of and keyed to axles 47 and 48 in pairs of bearings 49 and 50 which in turn are fixed atop pairs of roller bases 51 and 52. Driven roller 46 is linked to the power source by means explained below.

A carriage 53 consisting of a plate slideably mounted atop frame 10 underneath belt 44 and wider than said belt, carries two upstanding lugs 54 and 55 mounted integrally with said plate on opposite sides thereof, each of said lugs being outwardly spaced from said conveyor belt and extending above the said belt. A plurality of cutting wires 56 are fixed to said lugs so as to extend horizontally therebetween and so as to be vertically spaced from one another. Since these wires are the ones which are the cutting elements of the device shown the vertical spacing between them will determine the thickness of the slices which will result from the action of the device. Carriage 53 and lugs 54 and 55 and cutting wires 56 are so positioned with reference to hopper 23 so that in the backward or cutting stroke, said wires may pass through the cutting area, namely the area between the bottom of said hopper and that portion of conveyor belt 44 underlying said hopper, and continue backwards so that each of said wires will pass between a pair of horizontally extending plates 57 which are positioned to the rear of said cutting area and which plates are vertically stacked, their front edges being vertically aligned and are fixedly mounted to the top of frame 10 to form a backing stack 58 which serves the double purpose of holding the material to be cut, in this case loaf of cheese 43, against horizontal displacement when cutting wires 56 first engage the same and continue therethrough, and of cleaning said wires after they pass through said loaf. The circles shown between said plates in Fig. 3 are intended to indicate generally the limit of the position reached by cutting wires 56 on the thrust or cutting stroke of carriage 53. Carriage 53 is linked to the power source by means more fully explained below.

The power source which may be contained in housing 59, suspended under the top of frame 10 (see Fig. 1) may consist generally of an electric motor and suitable gearing connected therewith. A drive shaft 60 extends downwardly from housing 59 and powers a dual cam assembly supported by shelf 61 which extends horizontally from and is supported by the rear legs of frame 10 underneath said housing. The uppermost of said cams, clamp cam 62, is keyed to drive shaft 60 and when rotated, the more radially extending portions thereof, operate to drive clamp cam follower 63 downwardly from said cam or, as viewed in Fig. 1, to the left thereof, thus pulling link 64 pivotally mounted to said follower, to the left and consequently rotating in a clockwise direction bell crank 35, which crank is pivotally mounted on axle 65 which in turn is journalled in a pair of horizontally spaced bearings 66 on the underside of the top of frame 10. Since the upper arm of bell crank 35 is pivotally linked to clamp shaft 34 the clockwise rotation of said crank is effective to depress said shaft. Such lowering of clamp shaft 34 causes stud shafts 36 to be rotated in a counterclockwise direction and such stud shafts in turn cause rocker shafts 38 to likewise rotate in such counterclockwise direction thus removing the short arms 42 of clamp members 40 from within hopper 23 and effectively disengaging such clamp members from loaf of cheese 43 in said hopper 23. Of course, when clamp cam follower 63 is caused to move to the right, a reverse action takes place, shaft 34 is lifted and said clamp members enter hopper 23 and engage said contents as may be reached by the short arms thereof.

Power is applied to lift hopper 23 in the following manner. As hopper cam 68, keyed to drive shaft 60, is rotated its more radially extended portions cause hopper cam follower 69 to move to the right causing link 70 pivotally connected with said follower to move to the right and causing bell crank 71, pivotally mounted on axle 65, to move in a counterclockwise direction, thus elevating link 72 which is pivotally connected with the upper arm of said bell crank. An arm 73 is fixedly connected to one end of a rocker shaft 74 which shaft is suspended horizontally by means of a pair of bearings 75 and 76 secured to the undersides of mounting plates 15 and 14 respectively, the other and lower end of said arm being pivotally secured to the upper end of link 72 so that when link 72 is raised arm 73 and rocker shaft 74, to which it is connected, as aforesaid, is caused to rotate in a counterclockwise direction. A hopper raising lever 77 is keyed integrally to rocker shaft 74 and makes contact at its free end with the underside of cross-piece 18. Hence as hopper raising lever 77 is rotated counterclockwise its free end and consequently cross-piece 18 are caused to move upwardly and thereby move hopper 23 in an upward direction, since cross-piece 18 is rigidly affixed to sleeves 16 and 17 which in turn by means of angle pieces 19, 20, 21 and 22 support hopper 23.

Carriage 53 is caused to reciprocate and the top portion of conveyor belt 44 is caused to intermittently advance to the right by power linkage to drive shaft 78 which extends through the top of motor housing 59. (See especially Fig. 3.) As drive shaft 78 rotates in a counterclockwise direction when viewed from above crank 79 which is keyed thereto, is caused to rotate with it thus pulling to the left link 80 which is pivotally mounted to the end of said crank which in turn causes rack 81 pivotally connected to the other side of said link 80 to likewise move to the left. Since carriage 53 is connected by studs 82, extending through slots 83 in the top of frame 10, to rack 81, such movement will cause said carriage to move to the left, likewise bringing cutting wires 56, borne by lugs 54 and 55 on said carriage, into the cutting area beneath hopper 23 and then into backing stack 58. As drive shaft 78 rotates more than 180° from the position shown in Fig. 3, link 80 and the associated rack 81 and carriage 53 will be pushed in the opposite direction, namely toward the right and hence during the time that the machine is in operation, e. g. drive shaft 78 is rotating, carriage 53 will be caused to reciprocably move between left and right limits. The toothed portion 84 of rack 81 extending to the right beyond the point at which studs 82 protrude upwardly to support carriage 53, meshes with a pinion 85 which pinion is integral with disc 86 and which floats on a transverse horizontal shaft 87 which shaft is mounted on a pair of horizontally spaced bearings 88 and 89 mounted upon a shelf 90 extending horizontally from and supported by the front legs of frame 10. A pinion 91 is keyed to shaft 87 and positioned on the other side of disc 86 so as to be in register with a pawl 92 fixed to said disc. Also keyed to shaft 87 is a sprocket 93 which in turn drives an endless chain 94, the other end of which meshes with a sprocket 95 which is keyed to axle 48 to which, as has been mentioned above, is keyed driven roller 46 which operates to move conveyor belt 44. Hence, when shaft 87 is caused to rotate it in turn rotates sprocket 93 which through chain 94 and sprocket 95 communicates such motion to driven roller 46 causing said conveyor belt to move. However, said shaft 87 and hence said conveyor belt 44 will be caused to move only as rack 81 is driven to the right, in which case it causes pinion 85, disc 86 and pawl 92 to rotate in a clockwise direction which in turn causes said pawl to grip the teeth of pinion 91 and hence rotate shaft 87 to which it is keyed. On the other hand, when rack 81 moves to the left, a counterclockwise motion is imparted to pinion 85, disc 86 and pawl 92 and the pawl escapes on pinion 91, thus causing no motion of shaft 87 or conveyor belt 44.

It will be noted that rack 81 is fixedly connected by studs 82 to carriage 53 and hence as carriage 53 moves to the left conveyor belt 44 will not move, but as carriage 53 moves to the right, conveyor belt 44 will move to the right in a synchronized movement. This means that when cutting wires 56 are thrust to the left on the cutting stroke, conveyor belt 44 will remain stationary, but as soon as said wires have reached their limit of travel in the left direction, i. e. in backing stack 58, and commence the return stroke after having produced a stack of sliced cheese by reason of having passed through loaf 43, then conveyor belt in synchronization with carriage 53 will move to the right removing the stack of cut slices from the cutting area and upon reaching the limit of travel in the right direction, the relative position of the cut stack and the cutting wires 56 will be as shown in Fig. 3.

In operation, a loaf of cheese 43 is placed in the top of hopper 23 while clamping elements 40 are in the disengaged position and falls through said hopper to rest on conveyor belt 44. Carriage 53 and cutting wires 56 are in the position shown in Fig. 1. As cutting wires 56 are carried to the left toward the cutting area, conveyor belt 44 remains stationary. After said wires pass through the protruding lower portion of loaf 43 clamping members 40 are caused to engage said loaf within hopper 23 and the entire hopper is caused to be slightly elevated, preferably to the extent of about one-quarter of an inch by the means described above. As carriage 53 commences its return stroke, conveyor belt 44 moves to the right carrying the stacked cut cheese 96 to the left in front of said cutting wires 56, loaf 43 remaining in an elevated position in hopper 23 until the moment when carriage 53 reaches its limit of travel to the right at which point clamping members 40 are caused to be disengaged by the means described above, loaf 43 drops to the now halted conveyor belt 44 and hopper 23 descends to its lower limit. The cycle may then, of course, be repeated to give continuous operation.

It will be noted that by reason of the vertical positioning of hopper 23 and the consequent gravity feed of the material to be cut, there are no mechanisms which push said material into the cutting area and accordingly an operator may continuously feed such material to the hopper. It should also be apparent that by reason of the cutting method employed herein and the step taken in elevating the hopper and its contents prior to the return stroke and prior to the initiation of movement of the conveyor that the cut slices will remain vertically aligned and in ideal position for packaging without the necessity of handling. The open construction of the device facilitates its cleaning. It is also obvious that sanitary measures may be easily applied.

Numerous variations may be made without departing from the spirit and scope of the present invention. Thus, if it is desired to produce single slabs instead of stacked slices there need be only one cutting wire mounted on upstanding lugs 54 and 55. Again, instead of employing wires, blades may be mounted upon said lugs. The cutting members which in the embodiment shown, are mounted normal to the direction of travel in the cutting stroke, could be mounted at an angle other than normal to said direction and this would be particularly helpful when cutting such processed meats as Bologna and salami.

Still further, the walls of hopper 23 instead of being permanently secured one to the other, may be adjustably connected so that the hopper may be suitable for bulk material of varying sizes. Again, it would constitute no departure to mount the cutting elements in a frame which frame could be slid in grooves or otherwise detachably secured to upstanding lugs 54 and 55. This would facilitate the use of the machine to obtain slices of varying thickness.

Although the present invention has been described with a certain degree of particularity, it is understood that the disclosure has been made only by way of example and that numerous additional changes in the details of construction, combination and arrangement of parts may be resorted to without transcending the scope of the invention as hereinafter claimed.

What is claimed is:

1. A cutting machine for cutting semi-soft material, comprising a hopper having a feeding opening for receiving said material and a discharge opening for discharging said material, a conveyor spaced from said discharge opening and defining a cutting area between said discharge opening and said conveyor, into which area said material is discharged from said hopper, a cutting member including at least one cutting element, first means to alternatively move said cutting member into said cutting area and through said material in a cutting stroke and out of said area in a return stroke, second means synchronized to said first means to actuate said conveyor being actuated only between the completion of a cutting stroke and the initiation of the next succeeding cutting stroke, to remove said cut material from said cutting area and means synchronized with said first means to move said hopper away from said cutting area during at least the commencement of the period of actuation of said conveyor.

2. A cutting machine as described in claim 1, and a backing member fixedly positioned proximate an end of said cutting area opposite the end of entry therein of said cutting element, to prevent displacement of said material during said cutting stroke.

3. A cutting machine as described in claim 1, said cutting member comprising a plurality of spaced cutting elements.

4. A cutting machine for cutting semi-soft material comprising a frame, a vertically extending hopper mounted thereon, said hopper having an upper feeding opening and a lower discharge opening so as to permit gravity feed of said material therein and therethrough, a cutting member, including a plurality of horizontally extending, vertically spaced cutting elements, movably mounted with relation to said frame, first means for reciprocating said elements along a predetermined path, a conveyor mounted beneath said discharge opening of said hopper, second means synchronized with said first means to permit intermittent gravity feed of said material from said discharge opening and into the path of said cutting elements, and third means synchronized with said first means to advance said conveyor, and thus remove the cut material, only during the return stroke of said cutting member and means synchronized with said first means to move said hopper away from said cutting area during at least the commencement of the period of actuation of said conveyor.

5. A cutting machine for cutting semi-soft material, comprising a frame, a vertically-extending hopper mounted thereon, said hopper having an upper feeding opening and a lower discharge opening so as to permit gravity feed of said material therein and therethrough, a conveyor disposed beneath said discharge opening, defining a cutting area between said discharge opening and said conveyor and providing a platform upon which the lower portion of the material discharged from said discharge opening and to be cut may rest, a cutting member, including a plurality of horizontally extending, vertically spaced cutting elements, movably mounted with relation to said frame, means to reciprocate said cutting member in and out of said cutting area in cutting and return strokes respectively, said conveyor being actuated during at least a portion of the return stroke of said cutting member, a backing member fixedly positioned proximate an end of said cutting area opposite the end of entry therein of said cutting member, to prevent displacement of said material during said cutting stroke, clamping means mounted on said hopper and positioned, when actuated, to engage the material in said hopper and retain the same therein, timed means synchronized with said cutting member to actuate said clamping means during at least the period of actuation of said conveyor, an elevating means synchronized with said timed means to move said hopper upward from said cutting area during at least the commencement of said period of actuation of said conveyor.

6. A cutting machine for cutting semi-soft material, comprising a hopper having a feeding opening for receiving said material and a discharge opening for discharging said material, clamping means mounted on said hopper and positioned, when actuated, to seize the material in said hopper and retain the same therein, a conveyor spaced from said discharge opening and defining a cutting area between said discharge opening and said conveyor, into which area said material is discharged from said hopper, a cutting member including at least one cutting element, means to alternatively move said cutting member into said cutting area and through said material in a cutting stroke and out of said area in a return stroke, said conveyor being actuated at least during a portion of said return stroke to remove said cut material from said cutting area, and timed means synchronized with said cutting member to actuate said clamping means during at least the period of actuation of said conveyor.

7. A cutting machine for cutting semi-soft material, comprising a hopper having a feeding opening for receiving said material and a discharge opening for discharging said material, clamping means mounted on said hopper and positioned, when actuated, to engage the material in said hopper and retain the same therein, a conveyor spaced from said discharge opening and defining a cutting area between said discharge opening and said conveyor, into which area said material is discharged from said hopper, a cutting member including at least one cutting element, means to alternatively move said cutting member into said cutting area and through said material in a cutting stroke and out of said area in a return stroke, said conveyor being actuated at least during a portion of said return stroke to remove said cut material from said cutting area, timed means synchronized with said cutting member to actuate said clamping means during at least the period of actuation of said conveyor, and means synchronized with said timed means to move said hopper away from said cutting area during at least the commencement of said period of actuation of said conveyor.

8. A cutting machine for cutting semi-soft material comprising a frame, a vertically extending hopper mounted thereon, said hopper having an upper feeding opening and a lower discharge opening so as to permit gravity feed of said material therein and therethrough, a cutting member, including a plurality of horizontally extending, vertically spaced cutting elements, movably mounted with relation to said frame, first means for reciprocating said elements along a predetermined path, a conveyor mounted beneath said discharge opening of said hopper, second means synchronized with said first means to permit intermittent gravity feed of said material from said discharge opening and into the path of said cutting elements, third means synchronized with said cutting member to elevate said hopper upon the return stroke of said cutting member, and fourth means synchronized with said cutting means to advance said conveyor, and thus remove the cut material, only during the return stroke of said cutting member.

9. A cutting machine for cutting semi-soft material comprising a frame, an upwardly-extending hopper mounted thereon, said hopper having an upper feeding opening and a lower discharge opening so as to permit gravity feed of said material therein and therethrough, clamping means mounted on said hopper and positioned, when actuated, to seize the material in said hopper and retain the same therein, a conveyor disposed beneath said discharge opening, defining a cutting area between said discharge opening and said conveyor and providing a platform upon which the lower portion of the material discharged from said discharge opening and to be cut may rest, a cutting member, including at least one horizontally disposed cutting element, movably mounted with relation to said frame, means to reciprocate said cutting member in and out of said cutting area in cutting and return strokes respectively, timed means synchronized with said cutting member to actuate said clamping means during at least the period of actuation of said conveyor, said conveyor being actuated during at least a predetermined portion of the return stroke of said cutting member.

10. A cutting machine for cutting semi-soft material comprising a frame, an upwardly-extending hopper mounted thereon, said hopper having an upper feeding opening and a lower discharge opening so as to permit gravity feed of said material therein and therethrough, clamping means mounted on said hopper and positioned, when actuated, to engage the material in said hopper and retain the same therein, a conveyor disposed beneath said discharge opening, defining a cutting area between said discharge opening and said conveyor and providing a platform upon which the lower portion of the material discharged from said discharge opening and to be cut may rest, a cutting member, including at least one horizontally disposed cutting element, movably mounted with relation to said frame, means to reciprocate said cutting member in and out of said cutting area in cutting and return strokes respectively, timed means synchronized with said cutting member to actuate said clamping means during at least the period of actuation of said conveyor, said conveyor being actuated during at least a predetermined portion of the return stroke of said cutting member, and means synchronized with said timed means to move said hopper away from said cutting area during at least the commencement of said period of actuation of said conveyor.

11. A cutting machine for cutting semi-soft material comprising a frame, an upwardly-extending hopper mounted thereon, said hopper having an upper feeding opening and a lower discharge opening so as to permit gravity feed of said material therein and therethrough, clamping means mounted on said hopper and positioned, when actuated, to seize the material in said hopper and retain the same therein, a conveyor disposed beneath said discharge opening, defining a cutting area between said discharge opening and said conveyor and providing a platform upon which the lower portion of the material discharged from said discharge opening and to be cut may rest, a cutting member, including at least one horizontally disposed cutting element, movably mounted with relation to said frame, means to reciprocate said cutting member in and out of said cutting area in cutting and return strokes respectively, timed means synchronized with said cutting member to actuate said clamping means during at least the preiod of actuation of said conveyor, said conveyor being advanced only between the completion of a cutting stroke and the initiation of the next succeeding cutting stroke.

12. A cutting machine of the type described comprising a hopper, having a discharge end, for containing the material to be cut, a cutting member including a plurality of spaced cutting elements, means for cyclically moving said cutting member along a predetermined path, means for periodically advancing said material through said discharge end into the path of said cutting member and a backing member disposed in the path of said cutting element to one side of said discharge end of said hopper, said backing member comprising a plurality of closely spaced members defining elongated openings between said members and positioned so that said elements pass into said openings, clamping means mounted on said hopper and positioned when actuated to seize the material in said hopper and retain the same therein, and timed means synchronized with said cutting member to actuate said clamping means during a predetermined portion of the cycle of operation of said cutting member.

References Cited in the file of this patent

UNITED STATES PATENTS

| 500,655 | Hall | July 4, 1893 |
| 719,413 | Anderson | Feb. 3, 1903 |
| 1,002,431 | Noack | Sept. 5, 1911 |
| 1,499,206 | Evanuk | June 24, 1924 |
| 1,827,977 | Erl | Oct. 20, 1931 |
| 2,115,102 | Gottfried | Apr. 26, 1938 |

FOREIGN PATENTS

| 441,634 | Germany | Mar. 5, 1927 |